US007844307B2

(12) United States Patent
Henson et al.

(10) Patent No.: US 7,844,307 B2
(45) Date of Patent: Nov. 30, 2010

(54) WIRELESS HANDSET HAVING SELECTIVE COMMUNICATION CONTROL AND CORRESPONDING METHODS

(75) Inventors: Matthew Brady Henson, Austin, TX (US); Thomas Glen Ragan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1048 days.

(21) Appl. No.: 11/340,441

(22) Filed: Jan. 26, 2006

(65) Prior Publication Data

US 2007/0173287 A1 Jul. 26, 2007

(51) Int. Cl.
*H04M 1/00* (2006.01)
*G08C 17/00* (2006.01)

(52) U.S. Cl. ...................................... 455/574; 370/311

(58) Field of Classification Search ................ 455/574, 455/572, 573, 557, 522; 370/311
See application file for complete search history.

(56) References Cited

U.S. PATENT DOCUMENTS

| | | | | |
|---|---|---|---|---|
| 5,726,636 | A * | 3/1998 | Hayes, Jr. | 340/636.1 |
| 6,275,712 | B1 * | 8/2001 | Gray et al. | 455/522 |
| 6,363,246 | B1 * | 3/2002 | Williams et al. | 455/403 |
| 6,427,072 | B1 * | 7/2002 | Reichelt | 455/404.1 |
| 6,643,527 | B2 * | 11/2003 | Satoh et al. | 455/574 |
| 6,668,179 | B2 * | 12/2003 | Jiang | 455/572 |
| 6,721,580 | B1 * | 4/2004 | Moon | 455/574 |
| 7,120,403 | B2 * | 10/2006 | Cohen et al. | 455/127.5 |
| 7,356,014 | B2 * | 4/2008 | Park et al. | 370/338 |
| 7,428,404 | B2 * | 9/2008 | Kawaguchi | 455/11.1 |
| 2001/0005686 | A1 * | 6/2001 | Naito et al. | 455/574 |
| 2001/0029196 | A1 * | 10/2001 | Wakamatsu | 455/574 |
| 2002/0016189 | A1 * | 2/2002 | Sheynblat et al. | 455/574 |
| 2002/0028701 | A1 * | 3/2002 | Satoh et al. | 455/574 |
| 2002/0082059 | A1 * | 6/2002 | Nariai et al. | 455/573 |
| 2003/0003972 | A1 * | 1/2003 | Sabat | 455/574 |
| 2003/0045272 | A1 * | 3/2003 | Burr | 455/411 |
| 2004/0106424 | A1 * | 6/2004 | Yoshizawa | 455/522 |
| 2004/0204183 | A1 * | 10/2004 | Lencevicius et al. | 455/574 |
| 2005/0288002 | A1 * | 12/2005 | Sparks et al. | 455/418 |
| 2006/0068852 | A1 * | 3/2006 | Doyle | 455/574 |
| 2007/0004467 | A1 * | 1/2007 | Chary | 455/572 |
| 2007/0099609 | A1 * | 5/2007 | Cai | 455/428 |

* cited by examiner

*Primary Examiner*—George Eng
*Assistant Examiner*—Christopher M Brandt

(57) ABSTRACT

A wireless handset includes a long range wireless transceiver for selectively providing an inbound communication and an outbound communication through a wireless telephone network. A battery monitor module monitors a remaining power of a battery and produces a control signal when the remaining power compares unfavorably to a reserve power threshold. A processing module allows an outbound communication to an allowed recipient when the control signal is asserted, and prohibits an outbound communication to a disallowed recipient when the control signal is asserted.

47 Claims, 13 Drawing Sheets

WIRELESS HANDSET HAVING SELECTIVE COMMUNICATION CONTROL AND CORRESPONDING METHODS

BACKGROUND OF THE INVENTION

1. Technical Field of the Invention

The present invention relates to wireless handsets used for accessing long range communication networks.

2. Description of Related Art

As is known, wireless handsets are commonly used to access long range communication networks. Examples of such networks include wireless telephone networks that operate cellular, personal communications service (PCS), general packet radio service (GPRS), global system for mobile communications (GSM), and integrated digital enhanced network (iDEN). These networks are capable of accessing the plain old telephone service (POTS) network as well as broadband data networks that provide Internet access and enhanced services such as streaming audio and video, television service, etc., in accordance with international wireless communications standards such as 2G, 2.5G and 3G.

Integrated circuits have enabled the creation of a plethora of handheld devices, however, to be "wired" in today's electronic world, a person needs to posses multiple handheld devices. For example, one may own a cellular telephone for cellular telephone service, a personal digital assistant (PDA) for scheduling, address book, etc., one or more thumb drives for extended memory functionality, a motion picture expert group (MPEG) audio layer 3 (MP3) player for storage and/or playback of digitally recorded music, a radio, etc. Thus, even though a single handheld device may be relatively small, carrying multiple handheld devices on one's person can become quite burdensome. This has led to the creation of devices with multiple functionalities. However, power consumption of these devices can be an issue when they are used more frequently for multiple uses.

Therefore, a need exists for wireless handsets that provide greater functionality and that are capable of conserving battery power.

DETAILED DESCRIPTION OF THE INVENTION

Figure 1:
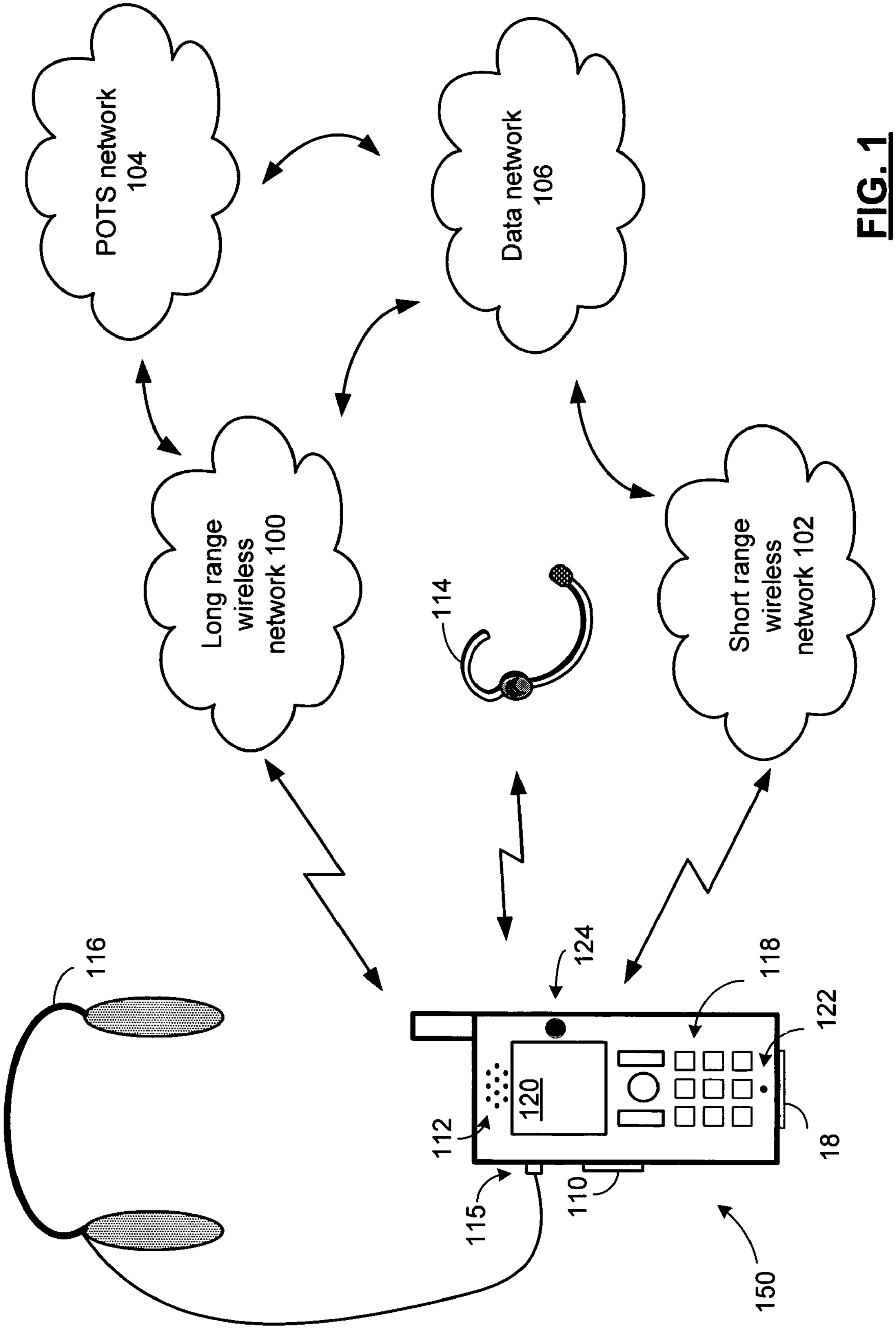
FIG. 1 presents a pictorial representation of a wireless handset in accordance with an embodiment of the present invention.

FIG. 1 presents a pictorial representation of a wireless handset in accordance with an embodiment of the present invention. In particular, a wireless handset 150 communicates over a long range wireless network 100 that is operably coupled to the POTS network 104 and data network 106. Wireless handset 150 can further communicate over short range wireless network 102 to data network 106. In an embodiment of the present invention, long range network 100 includes a wireless telephone network such as a cellular, PCS, GPRS, GSM, iDEN or other wireless communications network capable of sending and receiving telephone calls. Further, data network 106 includes the Internet and short range wireless network 102 includes an access point that communicates with the wireless handset 150 via a radio frequency communications link such as 802.11x, Wimax, a wireless local area network connection of other communications link. In this fashion, wireless handset 150 can place and receive telephone calls, text messages such as emails, short message service (SMS) messages, pages and other data messages that may include multimedia attachments such as documents, audio files, video files, images and other graphics.

Wireless handset 150 includes internal audio input device such as microphone 122 and internal audio output device such as speaker 112. In addition, headphones 116 can optionally be connected via headphone jack 115. Wireless headset 114 further includes an audio input device and audio output device that are connected to provide access to a peripheral device such as wireless headset 114 via a short range wireless communications link that uses an infrared link such as IrDA, or a radio frequency communications link conforming to the Bluetooth standard. The user interface of wireless handset 150 includes a keypad 118 and a display device 120 for displaying graphics and text, and optionally providing an additional touch sensitive interface with soft keys and/or graphics input and or handwriting recognition.

Wireless handset optionally includes a camera 124 for capturing still and/or video images, removable memory card 100 for providing additional memory and removable storage, and host interface 18 for uploading and downloading information directly to a host device such as a computer.

The various features and functions of wireless handset 150 will be discussed in conjunction with the figures that follow.

Figure 2:
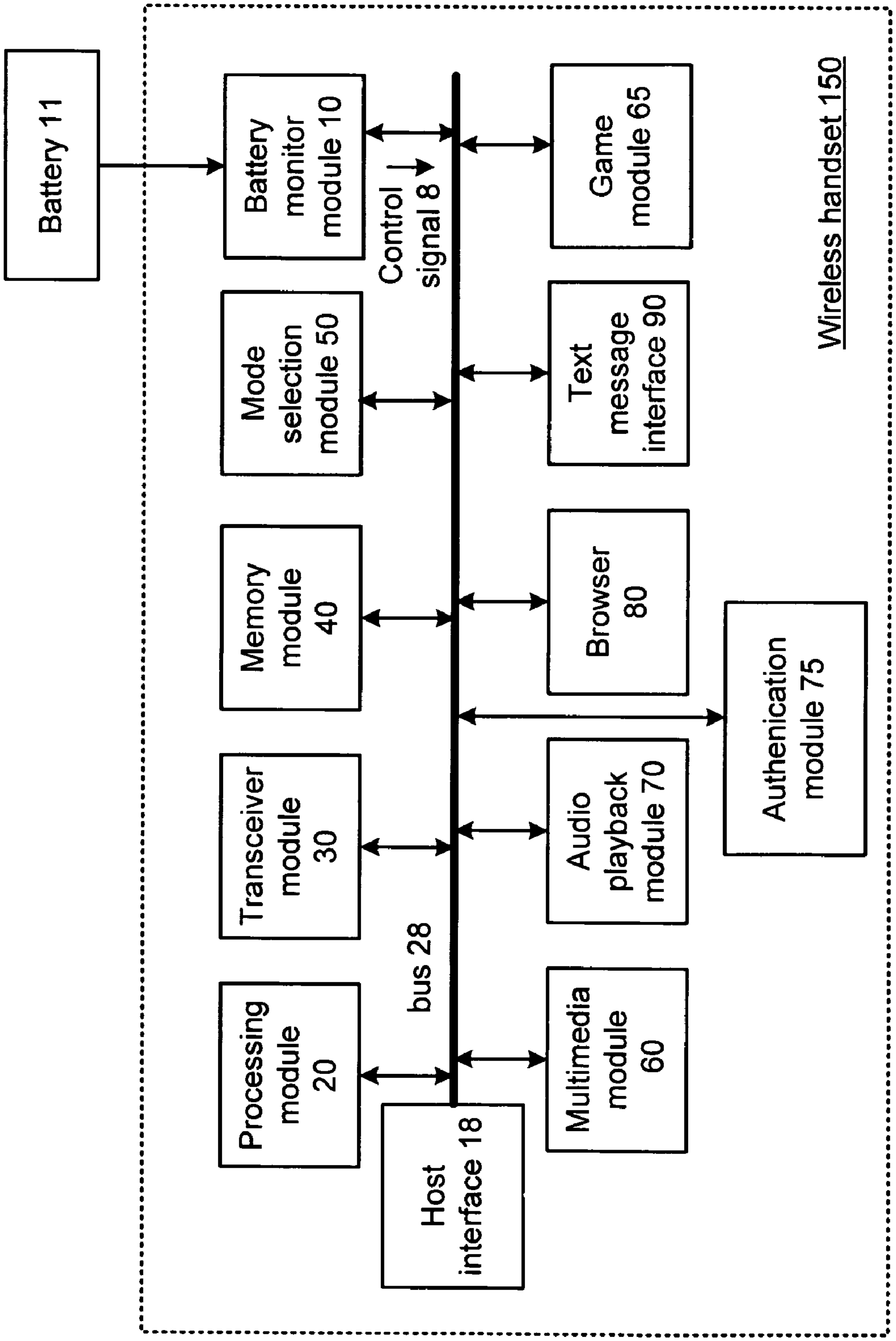
FIG. 2 presents a block diagram representation of wireless handset 150 in accordance with an embodiment of the present invention.

FIG. 2 presents a block diagram representation of wireless handset 150 in accordance with an embodiment of the present invention. In particular, wireless handset 150 includes a processing module 20 and memory module 40 that communicate via bus 28. In an embodiment of the present invention, processing module 20 includes a processor for executing a series of operational instructions such as system programs, application programs, and other routines.

The processor of processing module 20 can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the processing module 20 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory module 40 stores, and the processing module 20 executes, operational instructions corresponding to at least some of the steps and/or functions illustrated herein.

The memory module 40 may be a single memory device or a plurality of memory devices. Such a memory device may be a read-only memory, random access memory, volatile memory, non-volatile memory, static memory, dynamic memory, flash memory, cache memory, and/or any device that stores digital information.

In addition, wireless handset 150 includes host interface 18, a text message interface 90 for providing a user interface for retrieving, selecting and composing text messages, a transceiver module 30 that includes one or more transceivers, a mode selection module 50 for placing the wireless handset 150 in one or more operating modes, a multimedia module 60 for processing input and output, a game module 65 for providing the user one or more user interactive games to play with the handset 150, an audio playback module 70 for processing audio output, an authentication module 75 for providing access to certain restricted functions and features via password, biometric screening or other security procedure and a browser 80 for providing a user interface for Internet access and similar content for accessing streaming audio and streaming video content, and for downloading data files such as may be text files, presentation files, user profile information for access to varies computer services (e.g., Internet access, email, etc.), digital audio files (e.g., MP3 files, WMA—Windows Media Architecture-, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. Further, wireless handset 150 includes a games module 65 for providing one or more user interactive games to be played on the handset 150.

In an embodiment of the present invention, transceiver module 30 includes a long range wireless transceiver for selectively providing an inbound communication and an outbound communication through a wireless telephone network. Battery 11 powers the wireless handset 150 in situations, such as when wireless handset 150 is disconnected from its charger and from a host device through host interface 18. Battery monitor module 10 monitors the remaining power of a battery 11 and asserts a control signal 8 when the remaining power compares unfavorably to a reserve power threshold.

In operation, processing module 20 determines whether or not control signal 8 is asserted. In response, processing module 20 allows an outbound communication to an allowed recipient when control signal 8 is not asserted and prohibits an outbound communication to a disallowed recipient when control signal 8 is asserted. This feature is useful to conserve the remaining battery power when the battery 11 is low.

In a battery power conservation mode, the remaining battery power is saved for outbound communications such as telephone calls, emails and other test messages that are directed to a limited set of allowed recipients. In an embodiment of the present invention, a screening list is stored in memory module 40 that includes one or more entries that can be used to determine allowed recipients, and optionally, allowed inbound calls as described later.

In an embodiment of the present invention, the reserve power threshold is above the minimum amount required to power the device while placing an outbound communication such as a wireless call over long range wireless network 100, a voice over Internet protocol (VOIP) call placed over data network 106, or a text message such as SMS message or email. For example, if the charged battery voltage is 6 volts, and the device must shut down for low voltage at 5 volts, a reserve power threshold can be 5.4 volts, if 5.4 volts is determined to allow a sufficient power reserve to power the device for several hours and to engage in an allowed call with a desired duration, such as 5-10 minutes and/or to allow a text message of desired duration, such as 100 kBytes. In an alternative embodiment, the power reserve threshold is determined based on an estimation of the remaining power of the battery or the remaining charge that is based on a measurement other than voltage. For instance, the current, charge or power delivered by the battery can be measured and accumulated to determine the amount of current, charge or power that has been consumed since the last recharge, and also how much remains. The reserve power threshold will depend on the battery voltage used, the battery technology, the power consumption of the device during a call and during a power conservation mode, the capacity of the battery, and on the desired amount of power reserve.

In an example of the operation of wireless handset 150, a parent sets up a screening list for use in accordance with the present invention. The screening list can contain one or more entries that are selected by the user for allowed communications in the event of a low battery condition. For instance, the list may contain telephone numbers, email addresses and/or other communication addresses where allowed recipients may be contacted such as:

| | |
|---|---|
| Dad | 512-555-2345 |
| Dad's cell | 512-555-2323 |
| Dad's SMS | 5125552323@mobile/mycingular.com |
| Dad's email | SuperDad@Sigmatel.com |
| Mom | 512-555-2346 |
| Mom's cell | 512-555-2324 |
| Poison Control | 866-555-1111 |

In addition to these user defined recipients, the screening list may contain at least one service defined recipient that is prestored by a service provider and that may be editable by the user. Examples include:

| | |
|---|---|
| Police Non- Emerg | 211 |
| Emergency | 911 |
| Wireless Service | 888-555-1234 |

While the screening list has been described above in terms of entries that include allowed recipients (with disallowed recipients being not listed), conversely, it can be setup to include entries that define disallowed recipients (with allowed recipients being not listed).

In an embodiment of the present invention this screening list may be set-up on a website or through a host device connected to host interface 18 and downloaded into wireless handset 150. Also, the screening list can be set up via the handset itself through the use of input output devices such as keypad 118 and display 120. In this embodiment of the present invention, the screening list may be locked, with restricted access provided by authentication module 75, such as password access, biometric access or other secure access required to change the list. In this fashion, the child, without the password, may not edit the screening list, such as to add a telephone number of a friend.

In operation, in accordance with the example discussed above, a child is given the telephone to use. The child may place and receive telephone calls on the telephone, but, when the battery monitor 10 determines that the remaining power compares unfavorably to a reserve power threshold, such as when the battery voltage drops below a predefined voltage, the mode select module places the handset in a battery conservation mode and in response, processing module 20 only allows an outbound communication to be placed to one of the allowed recipient, such as the recipients corresponding to the entries on the screening list. If the child tries to call, email or send a text message a friend that is not on the screening list, processing module 20 prohibits the outbound communication to conserve the remaining battery power.

In an embodiment of the present invention, the screening list is presented to the user as a text display on video and/or text display device 120. The user is allowed to navigate the text display using a cursor or other selection mode to select an allowed recipient to place an allowed call.

In an embodiment of the present invention, processing module 20 is further operable to prohibit an inbound communication when the control signal is asserted. In this fashion, the child can be prohibited from receiving calls from his friends in attempt to conserve power. In a further embodiment, processing module 20 is further operable to determine caller identification data corresponding to an inbound communication, allowing an inbound call or text message if the caller identification data corresponds to a screening list entry when the control signal is asserted, and for prohibiting the inbound communication if the caller identification data does not correspond to a screening list entry, when the control signal is asserted. In this embodiment, incoming calls or text messages matching the screening list, for example from Mom's Cell or Dad can be received, but not from others that are not on the screening list.

In an embodiment of the present invention, the user may override and allow a prohibited activity by demonstrating access privileges, such as password access, biometric access or other secure access where a user is authenticated through authentication module 75. If the parent has the child's wireless handset may choose to tap into the power reserve for their own purposes. Further, a child may use the power reserve to place an outbound communication to the parent to request the password to engage in a prohibited activity, such as to place a call that would otherwise be prohibited. In an embodiment of the present invention, one-time passwords (that may, optionally, not be used to edit the screening list) may be set by the parent and accepted by the authentication module 75 for a single use—maintaining the security and purpose of the prohibited activities for future events.

While the example above has been described in terms of a parent/child relationship, the present invention may be likewise used in an employer/employee relationship, and/or in other situations where the features of the present invention prove useful. Further details, including additional function and features will be described in conjunction with the figures that follow.

Each of these modules may be implemented in hardware, firmware, software or a combination thereof, in accordance with the broad scope of the present invention. While a particular bus architecture is shown in FIG. 2, alternative bus architectures that include further connectivity, such as direct connectivity between the various modules, are likewise possible to implement the features and functions included in the various embodiments of the present invention.

Figure 3:
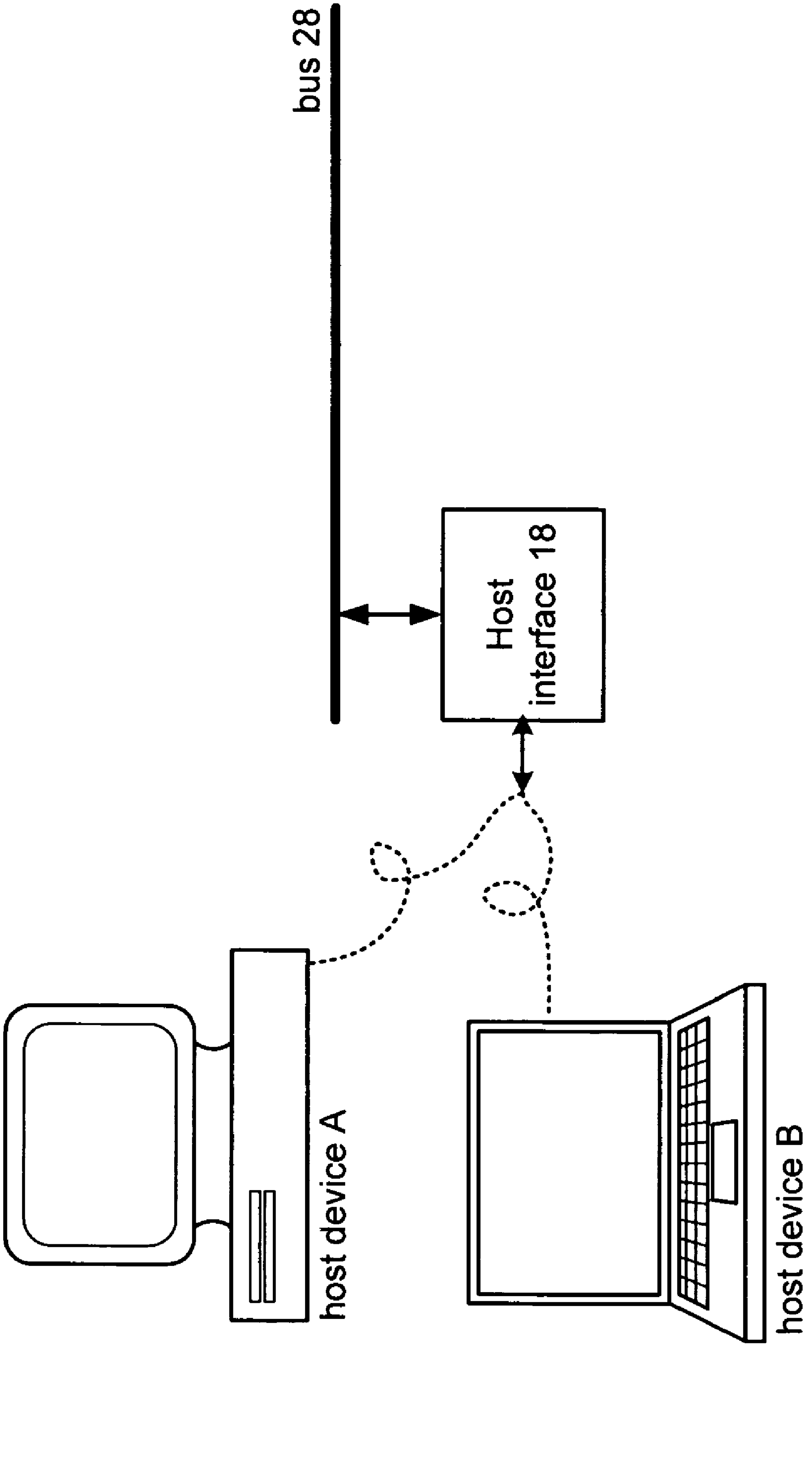
FIG. 3 presents a block/pictorial diagram of a host interface 18 in accordance with an embodiment of the present invention.

FIG. 3 presents a block/pictorial diagram of a host interface 18 in accordance with an embodiment of the present invention. In particular, the operation of wireless handset is described when optional host interface 18 is included. When the wireless handset 150 is operably coupled to a host device A, or B which may be a personal computer, workstation, server (which are represented by host device A), a laptop computer (host device B), a personal digital assistant and/or any other device that may send and receive data with the multi-function handheld device, the mode selection module 50 places the integrated circuit 12 in a host connected mode.

With the wireless handset 150 is in the host connected mode, the host interface 18 facilitates the transfer of data between the host device A or B and wireless handset 150. For example, data received from the host device A, or B is first received via the host interface 18. Depending on the type of coupling between the host device and the wireless handset 150, the received data will be formatted in a particular manner. For example, if the wireless handset is coupled to the host device via a USB cable, the received data will be in accordance with the format proscribed by the USB specification. The host interface 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory 16. Under the control of the processing module 20, the data words are provided to memory module 40 for storage. In this mode, the wireless handset 150 is functioning as extended memory of the host device (e.g., like a thumb drive).

In furtherance of the host connected mode, the host device may retrieve data from memory module 40 as if the memory were part of the computer. Accordingly, the host device provides a read command to the wireless handset 150, which is received via the host interface 18. The host interface 18 converts the read request into a generic format and provides the request to the processing module 20. The processing module 20 interprets the read request and coordinates the retrieval of the requested data from memory module 40. The retrieved data is provided to the host interface 18, which converts the format of the retrieved data from the generic format of the wireless handset 150 into the format of the coupling between the wireless handset and the host device. The host interface 18 then provides the formatted data to the host device via the coupling.

The coupling between the host device and the wireless handset 150 may be a wireless connection or a wired connection. For instance, a wireless connection, provided by transceiver module 30 may be in accordance with Bluetooth, IEEE 802.11x, and/or any other wireless LAN (local area network) protocol, IrDA, etc. The wired connection may be in accordance with one or more Ethernet protocols, Firewire, USB, etc. Depending on the particular type of connection, the host interface 18 includes a corresponding encoder and decoder. For example, when the wireless handset 150 is coupled to the host device via a USB cable, the host interface 18 includes a USB encoder and a USB decoder.

As one of average skill in the art will appreciate, the data stored in memory module, which may have 64 Mbytes or greater of storage capacity, may be text files, presentation files, user profile information for access to varies computer services (e.g., Internet access, email, etc.), digital audio files (e.g., MP3 files, WMA—Windows Media Architecture-, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format.

In an embodiment of the present invention, when the wireless handset 150 is coupled to the host device A or B via a wired connection or direct coupling, the host device may power the wireless device 150 such that the battery is unused and/or may further recharge the battery of wireless device 150. When the wireless handset 150 is uncoupled from the host device, the mode selection module 50 detects the disconnection and places the wireless handset in an alternative operational mode.

In an embodiment of the present invention, when the wireless handset is placed in the host connected mode, a screening list stored in host device A or B is synchronized with the screening list stored in memory module 40. In this fashion, changes to the screening list made on host device A or B can be downloaded to wireless handset 150. Similarly, changes to the screening list made on wireless handset 150 can be uploaded to host device A or B for storage and retrieval, when needed such as in the event of data loss in wireless handset 150 of replacement of the device.

Figure 4:
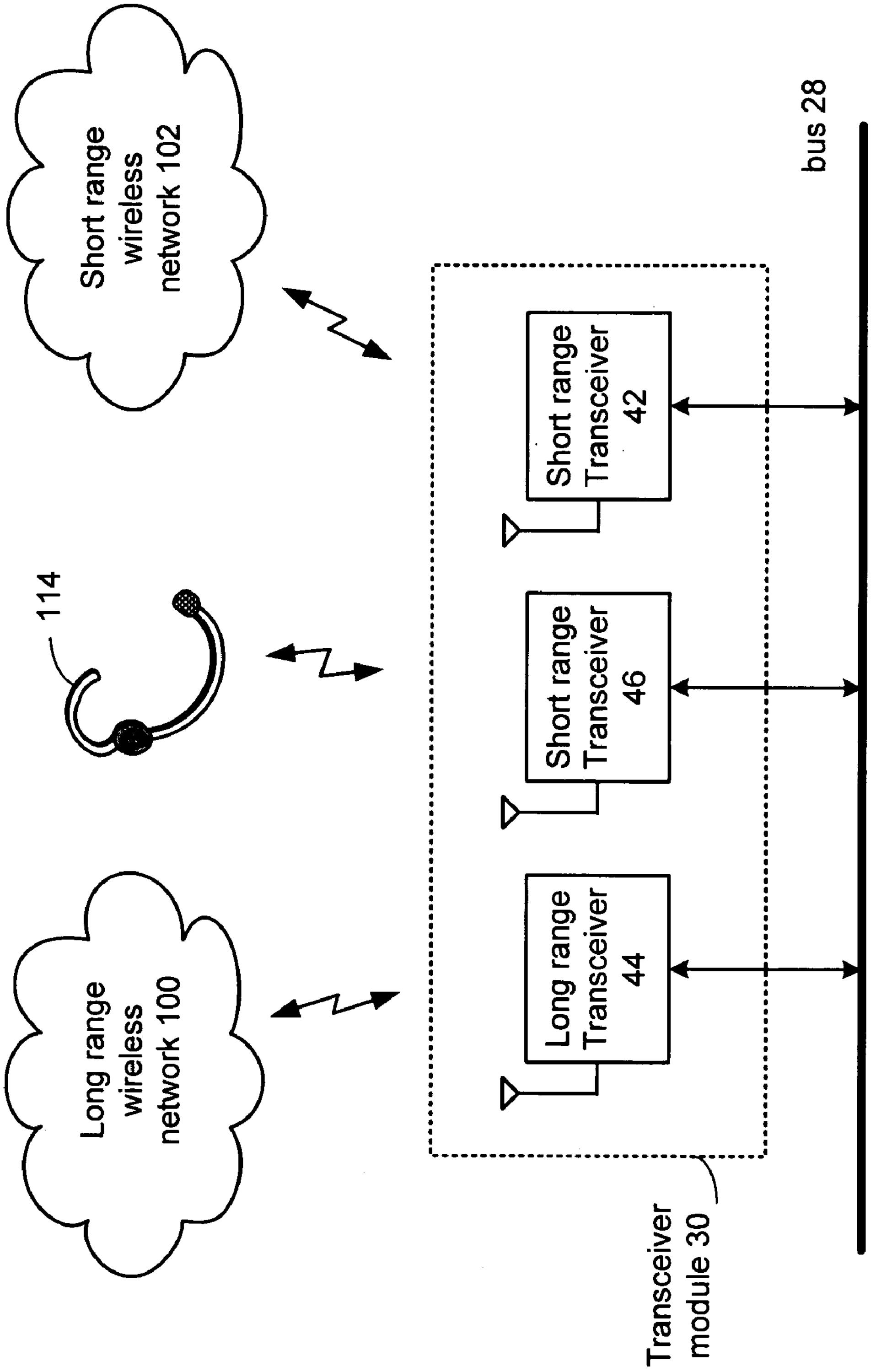
FIG. 4 presents block/pictorial representation of transceiver module 30 in accordance with an embodiment of the present invention.

FIG. 4 presents block/pictorial representation of transceiver module 30 in accordance with an embodiment of the present invention. In an embodiment of the present invention, transceiver module 30 includes long range transceiver 44, and short range transceivers 42 and 46. Long range transceiver 44 provides access to long range wireless network 100, short range transceiver 42 provides access to short range wireless network 102 and short range transceiver 46 provides access to wireless peripheral devices such as host A or B when host interface 18 is implemented with a wireless connection, wireless headset 114, a wireless keyboard or other peripheral devices.

Figure 5:
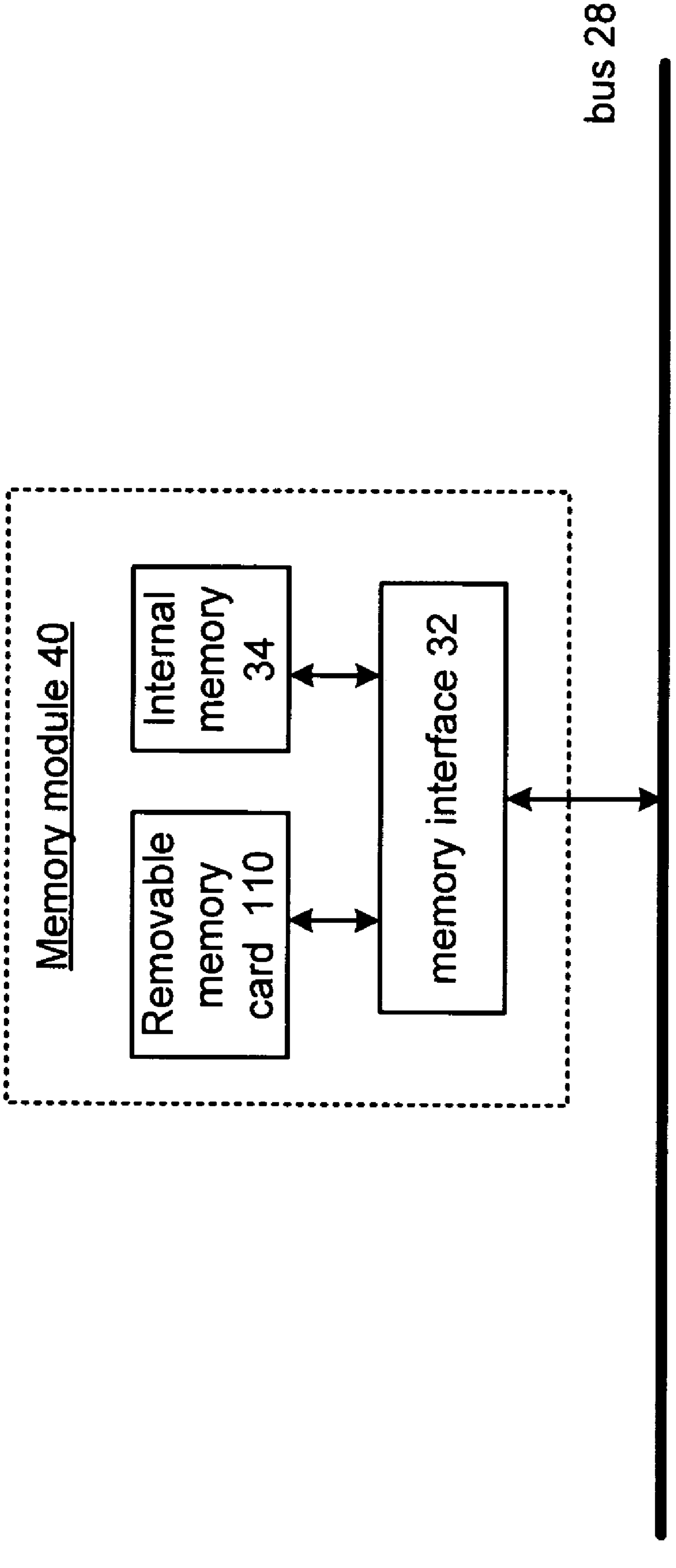
FIG. 5 presents a block diagram representation of memory module 40 in accordance with an embodiment of the present invention.

FIG. 5 presents a block diagram representation of memory module 40 in accordance with an embodiment of the present invention. In particular, memory module 40 includes a memory interface 32 for accessing an internal memory 34 and removable memory card 110. In an embodiment of the present invention, removable memory card 110 can include non-volatile memory in a format such as CompactFlash, SmartMedia, Memory Stick, Secure Digital (SD) card, xD card or other memory card format. In an embodiment of the present invention, removable memory card 110 can store data such as the screening list, text files, presentation files, user profile information for access to varies computer services (e.g., Internet access, email, etc.), digital audio files (e.g., MP3 files, WMA—Windows Media Architecture-, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format.

Figure 6:
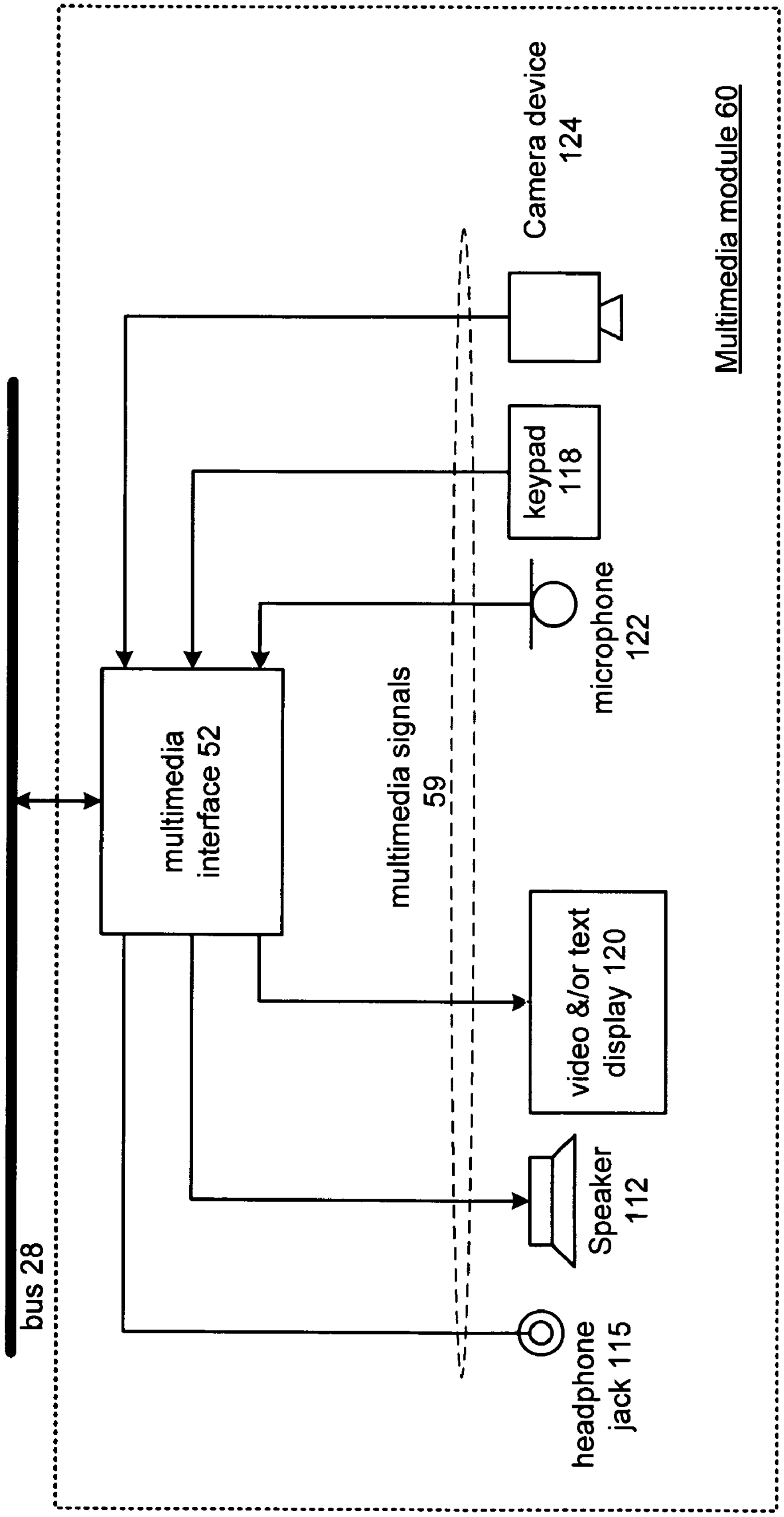
FIG. 6 presents a block/schematic diagram representation of a multimedia module in accordance with an embodiment of the present invention.

FIG. 6 presents a block/schematic diagram representation of a multimedia module in accordance with an embodiment of the present invention. In particular, multimedia module 60 includes a multimedia interface 52 for providing multimedia signals to and from a variety of input/output devices including headphones 116 via headphone jack 115, speaker 112, video and/or text display 120, microphone 122, keypad 118 and camera device 124. These multimedia signals 59 may be analog signals, discrete time signals, or digital signals depending on particular form and format used by each device.

Figure 7:
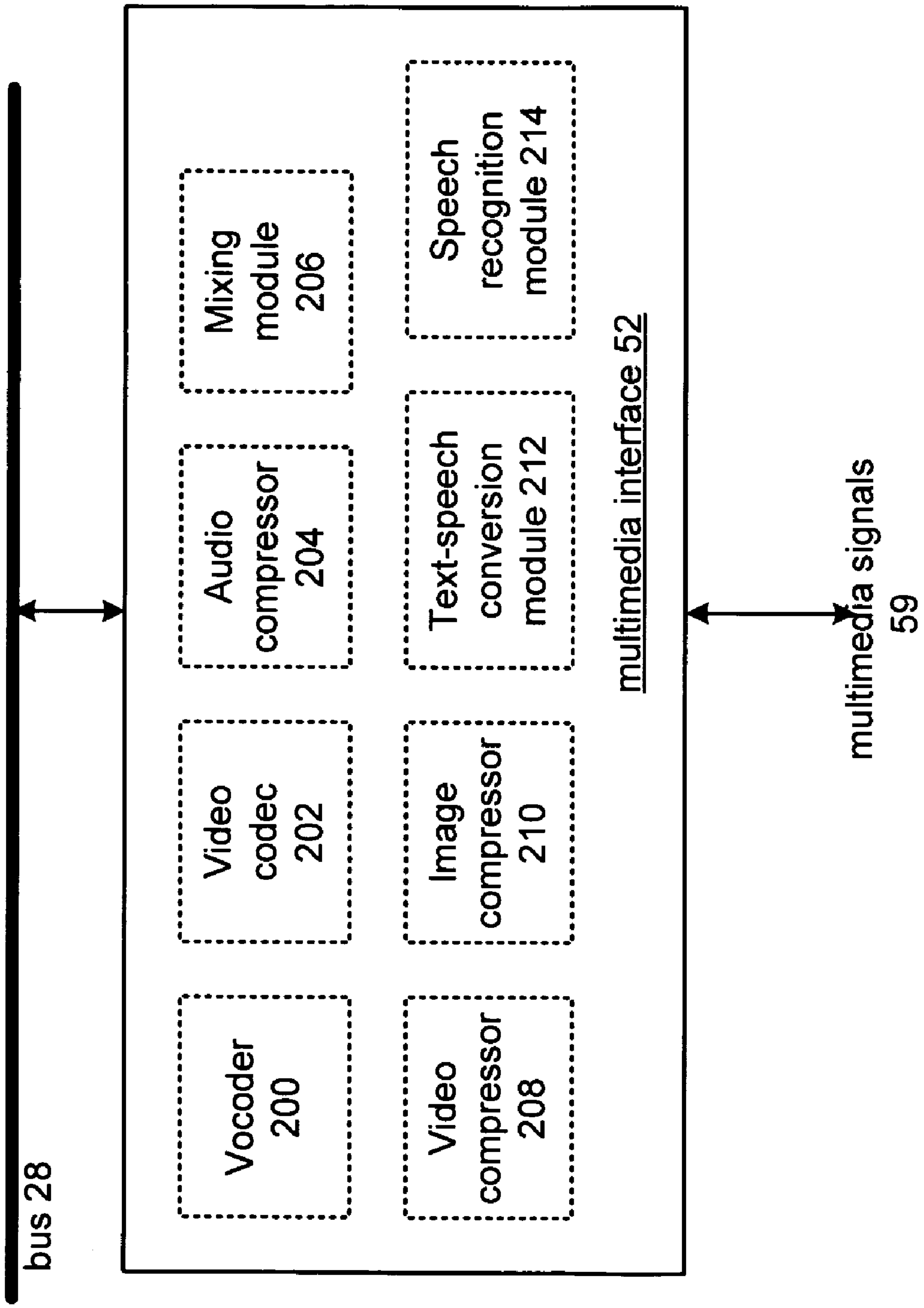
FIG. 7 presents a block diagram representation of a multimedia interface 52 in accordance with an embodiment of the present invention.

FIG. 7 presents a block diagram representation of a multimedia interface 52 in accordance with an embodiment of the present invention. In particular, multimedia interface 52 provides digital to analog conversion, analog to digital conversion, formats output signals sent to output devices of multimedia module 60 and processes input signals for coding, compression, storage and further processing by the various submodules of multimedia interface 52 and by the other modules of wireless handset 150. The submodules of multimedia interface 52 optionally include one or more of the following: a vocoder 200 for digitizing voice signals, a video codec 202 for digitizing video signals, an audio compressor 204 for creating compressed audio files, a mixing module 206 for mixing two or more audio streams, a video compressor 208 for creating compressed video files, an image compressor 210 for creating compressed image files, a text-to speech conversion module 212 for converting text data into to synthesized voice signals, and a speech recognition module 214 for recognizing the content of speech such as one or more spoken commands.

In an embodiment of the present invention under the control of the processing module 20, the multimedia module 60 retrieves multimedia data from memory module 40. The multimedia data includes at least one of digitized audio data, digital video data, and text data. In a playback mode, upon retrieval of the multimedia data, the multimedia module 60 converts the data into output data. For example, the multimedia module 60 may convert digitized data into analog signals that are subsequently rendered audible via a speaker or via a headphone jack. In addition, or in the alternative,. the multimedia module 60 may render digital video data and/or digital text data into RGB (red-green-blue), YUV, etc., data for display on an LCD (liquid crystal display) monitor, projection CRT, and/or on a plasma type display, such as display 120.

In a storage mode, the wireless handset 150 may store digital information received via one of the input devices 118, 122 and 124. For example, a voice recording received via the microphone 122 may be digitized via the multimedia module 60 and digitally stored in memory module 40. Similarly, video recordings may be captured via the camera device 124 (e.g., a digital camera, a camcorder, VCR output, DVD output, etc.) and processed by the multimedia module 60 for storage as digital video data in memory module 40. Further, the keypad 118 (which may be a keyboard, touch screen interface, or other mechanism for inputting text information) provides text data to the multimedia module 60 for storage as digital text data in memory module 40.

As will be understood by one skilled in the art when presented the disclosure herein, the multimedia module 60 may include less than the components shown in FIGS. 6 and 7. For instance, the multimedia module 60 may process audio, but not video data, or vice versa. Further, the multimedia module 60 can include further coding, decoding, formatting, encryption, decryption and signal processing modules than are specifically shown. In addition, multimedia module 60 can be implemented with audio and video inputs, in addition to the inputs that are expressly illustrated.

Figure 8:
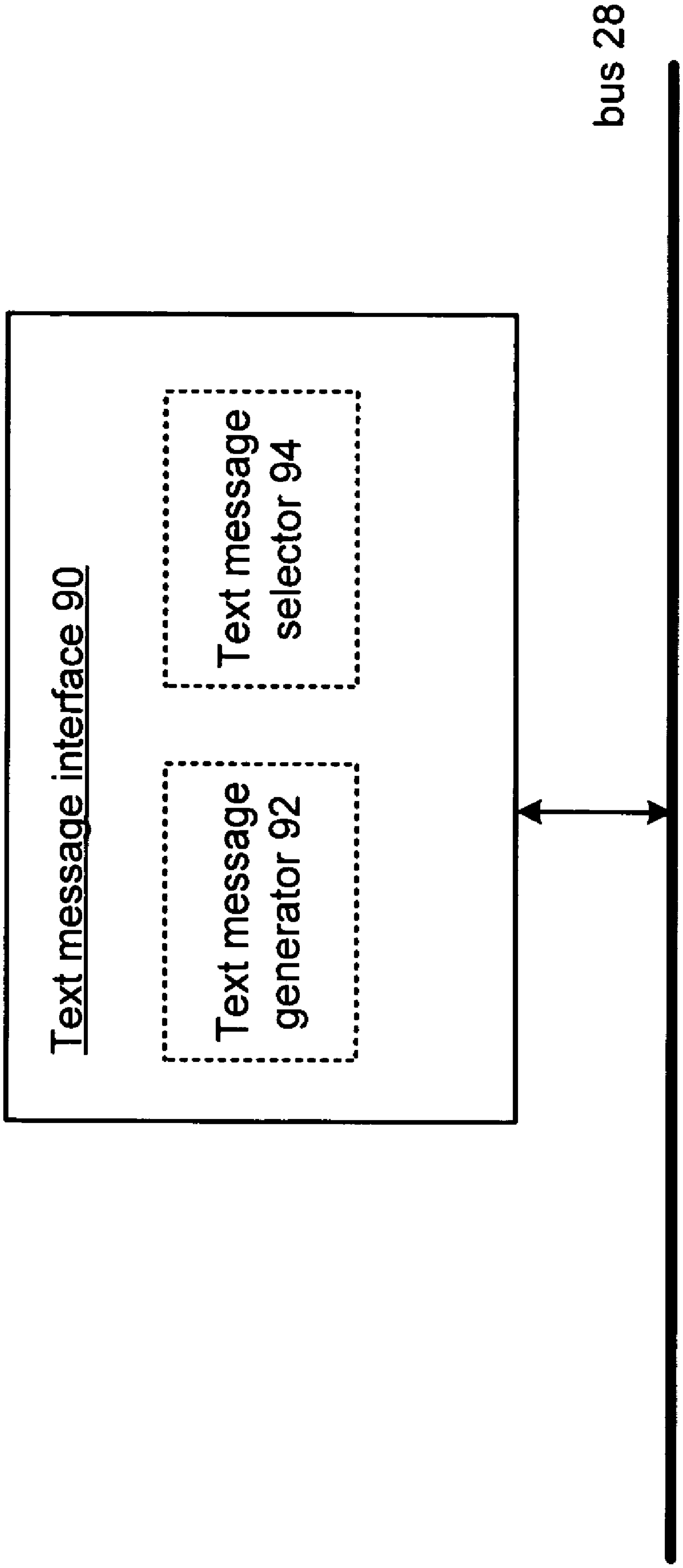
FIG. 8 presents a block diagram representation of a text message interface 90 in accordance with an embodiment of the present invention.

FIG. 8 presents a block diagram representation of a text message interface 90 in accordance with an embodiment of the present invention. In particular, text message interface 90 includes a text message generator 92 that allows a user to compose a text message, and a text message selector 94 that allows a user to select one or more text messages that have been received. In an embodiment of the present invention, text message interface 90 includes an inbox folder, sent message folder, draft message folder, trash folder, and addresses folder that allow a user to receive, review, forward and reply to a text message that is received and to draft, edit, address, and attach files to a text message that is sent.

In an embodiment of the present invention, the processing module is further operable to prohibit at least one other function of wireless handset 150 when the control signal 8 is asserted. In this fashion, wireless handset 150 can prohibit one or more of the following functions such as: a user interactive game, Internet access, a capturing an image, access to a broadband data network, and access to a peripheral device, functions that may not be associated with the allowed communications, such as with the persons corresponding to entries on the screening list, or other functions and features of the wireless handset 150.

In an example of the operation of wireless handset 150, the screening list as described herein can further contain one or more entries that are selected by the user for disallowed functions in the event of a low battery condition. For instance, the list may illustratively contain entries such as:

| |
|---|
| Any Games |
| Audio playback of MP3 files or WMA files |
| Voice recording |
| Internet Access |
| Access to website: hotdownloads@prodigy.com |
| Bluetooth connection |
| IrDA connection |
| WiFi connection |

In addition to these user defined recipients, the screening list may contain at least one service defined recipient that are prestored by a service provider and that may be editable by the user. While the screening list has been described above in terms of entries that include disallowed functions (with allowed functions being the functions not listed), conversely, it can be setup to include entries that define allowed functions (with disallowed functions being the functions not listed).

In an embodiment of the present invention this screening list may be set-up on a website or through a host device connected to host interface 18 and downloaded into wireless handset 150. Also, the screening list can be set up via the handset itself through the use of input output devices such as keypad 118 and display 120. In this embodiment of the present invention, the screening list may be locked, with restricted access provided by authentication module 75, such as password access, biometric access or other secure access required to change the list. In this fashion, the child, without the password, may not edit the screening list, such as to add a game or Internet access to the detriment of the purpose of the present invention.

In an embodiment, in the event that one or more functions is in progress at the time that the control signal 8 is asserted that would be prohibited in a power conservation mode, the wireless handset 150 is further operable to suspend these functions when the control signal is asserted. In this way, the user cannot draw additional battery power from the power reserve for this particular function or functions.

In an embodiment of the present invention, the user may override and allow a prohibited function, or a suspended function or feature by demonstrating access privileges, such as password access, biometric access or other secure access where a user is authenticated through authentication module 75. If the parent has the child's wireless handset may choose to tap into the power reserve for their own purposes. Further, a child may use the power reserve to place an outbound communication to the parent to request the password to engage in a prohibited function, such as to access a website that a parent may feel is currently justified. In an embodiment of the present invention, one-time passwords (that may, optionally, not be used to edit the screening list) may be set by the parent and accepted by the authentication module 75 for a single use—maintaining the security and purpose of the prohibited activities for future events.

In an embodiment, the processing module 20 is further operable to produce a suspending function indicator, prior to suspending the at least one function to alert the user that power reserve threshold has been reached and that the function is being suspended. In a further embodiment, notice is given to the user that the suspension will occur in a predetermined time.

In an embodiment of the present invention, this indicator includes playback of a first audio stream derived from text to speech conversion of stored message text generated by text to speech conversion module 212. In a further embodiment, the playback includes playback of an audio stream derived from a stored audio file. Examples include:

"Your battery has reached its power reserve. To conserve power, your game will end in 1 minute."

"Your battery power is low. To conserve power, your internet session will end in 2 minutes. Please enter your password now to continue your internet session."

"Your battery power is low. To conserve power, your camera will be shut down in 4 minutes."

"Your battery has reached its power reserve. To conserve power, your Bluetooth peripherals will be disconnected in 1 minute."

"Your battery power is low. To conserve power, your camera will be shut down in 4 minutes."

"Your battery power is low. Your audio playback will end shortly. Please enter your password now to continue playback."

In an embodiment where a call is in progress that would be prohibited when the control signal is asserted, the processing module is further operable to end a call in progress when the control signal is present and is further operable to produce an audible suspending call indicator, prior to ending the call in the manner described above. For example:

"Your battery power is low. To conserve power, your call will end in 1 minute."

"Your battery power is low. To conserve power, your call will end in 1 minute. Please enter your password if you wish to continue your call."

In an embodiment where the function in progress involves the playback of audio content, such as streaming audio or video during access to a broadband network or Internet access, a telephone call in progress, or during the playback of a music file, mixing module 206 can mix the audio stream from the audible indicator and the audio content associated with the function to provide a more pleasant user experience. In an alternative embodiment of the present invention, the audio content associated with the function in progress can be muted, paused or suspended during the playback of the indicator.

While the indicators discussed above contain recorded or synthesized speech, in an embodiment of the present invention, the indicator may be a tone, sound, text message graphic or icon displayed on display 120 icon, or light, vibration or other status indicator.

Figure 9:
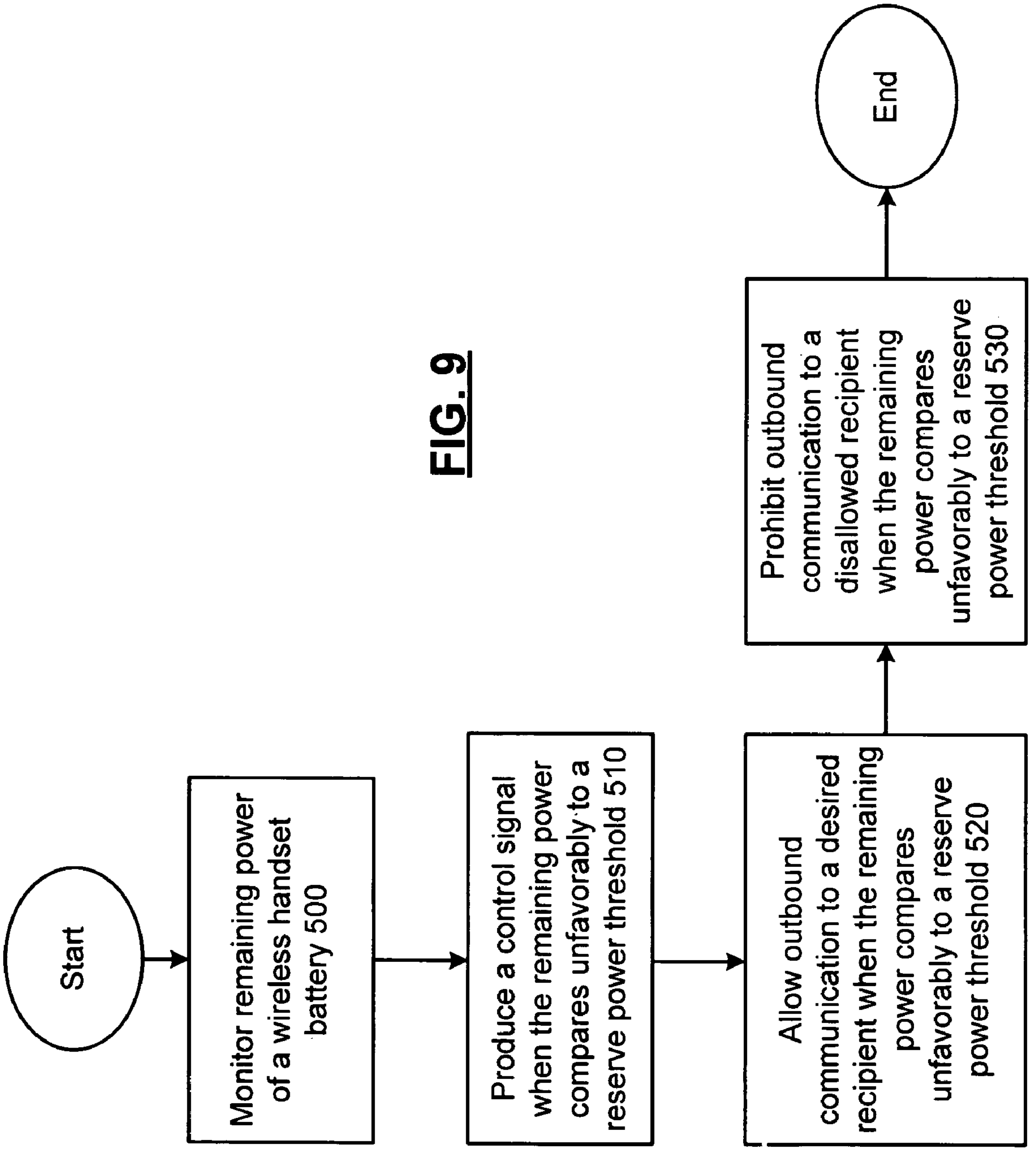
FIG. 9 presents a flowchart representation of a method in accordance with an embodiment of the present invention.

FIG. 9 presents a flowchart representation of a method in accordance with an embodiment of the present invention. In particular, this method can be used in conjunction with the embodiments of the present invention described in conjunction with FIGS. 1-8. The method begins in step 500 by monitoring a remaining power of a wireless handset battery. In step 510 a control signal is produced when the remaining power compares unfavorably to a reserve power threshold. In step 520 an outbound communication is allowed from the wireless handset to an allowed recipient when the remaining power compares unfavorably to a reserve power threshold. In step 530, an outbound communication is prohibited to a disallowed recipient when the remaining power compares unfavorably to a reserve power threshold.

Figure 10:
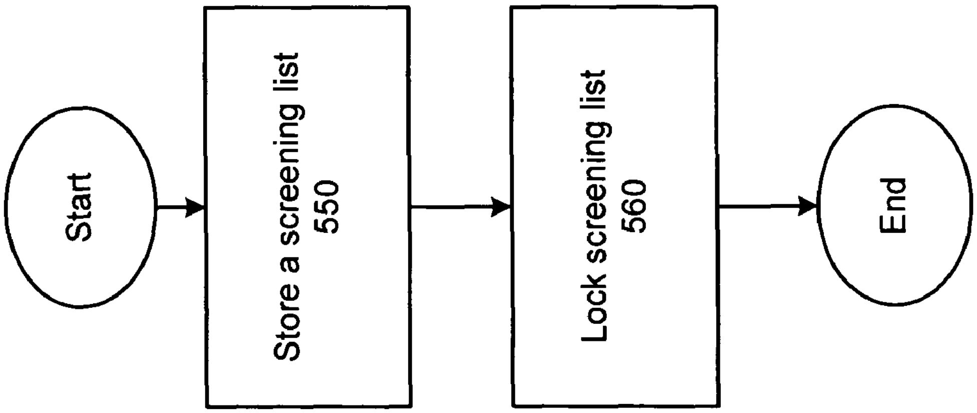
FIG. 10 presents a flowchart representation of a method in accordance with an embodiment of the present invention.

FIG. 10 presents a flowchart representation of a method in accordance with an embodiment of the present invention. In particular, this method can be used in conjunction with the embodiments of the present invention described in conjunction with FIGS. 1-9. In step 550 a screening list is stored and in step 560, the screening list is locked, to provide only authorized access to the list in the event that changes are required.

Figure 11:
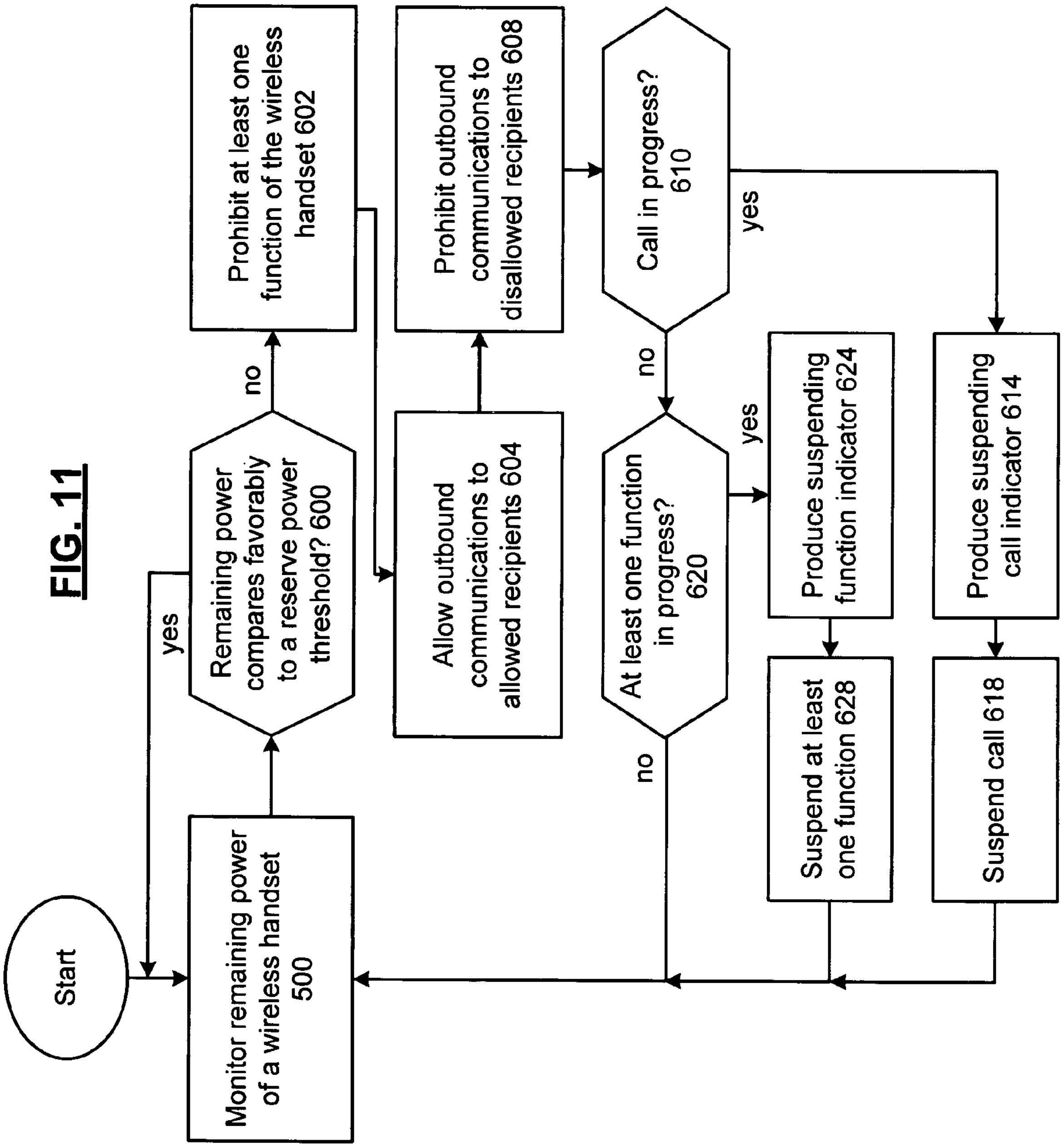
FIG. 11 presents a flowchart representation of a method in accordance with an embodiment of the present invention.

FIG. 11 presents a flowchart representation of a method in accordance with an embodiment of the present invention. In particular, this method can be used in conjunction with the embodiments of the present invention described in conjunction with FIGS. 1-10. The method begins as in FIG. 9 with step 500 of monitoring the remaining power of a wireless handset. In step 600, the method determines if the remaining power compares favorably to a reserve power threshold. In the event that the remaining power compares unfavorably to a reserve power threshold, at least one function of the wireless handset is prohibited as shown in step 602, outbound calls are allowed if directed to allowed recipients as shown in step 604. In addition, other outbound calls are prohibited as shown in step 608. In step 610, the method determines if a call is in process that would be prohibited. If so, the method proceeds to step 614 to produce a suspending call indicator and to step 618 to suspend the call. In step 620, the method determines if a function is in progress that needs to be suspended. If so, the method proceeds to produce a suspended function indicator as shown in step 624 and to suspend the function as shown in step 628.

As discussed herein the at least one function can includes one of: a user interactive game, playback of a stored audio file, Internet access, access to a broadband data network, and access to a peripheral device, or other functions of the device that are deemed to be nonessential to the task of the allowed communications.

Figure 12:
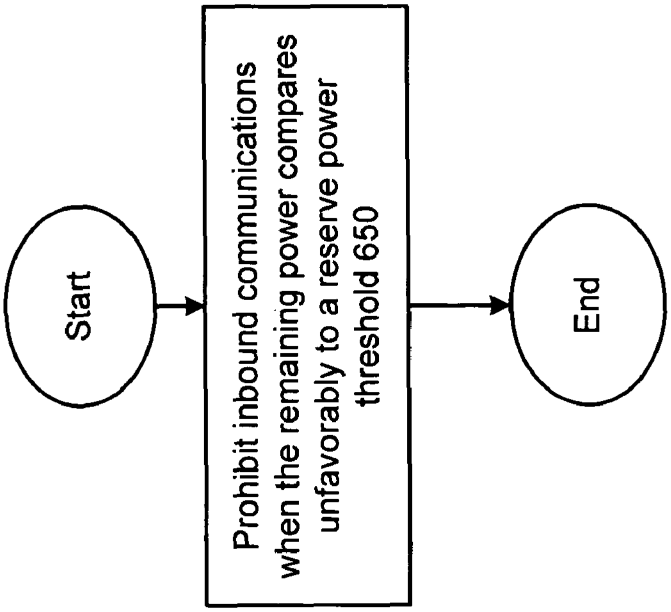
FIG. 12 presents a flowchart representation of a method in accordance with an embodiment of the present invention.

FIG. 12 presents a flowchart representation of a method in accordance with an embodiment of the present invention. In particular, this method can be used in conjunction with the embodiments of the present invention described in conjunction with FIGS. 1-11. In step 650, when the remaining power compares unfavorably to a reserve power threshold, inbound communications are prohibited.

Figure 13:
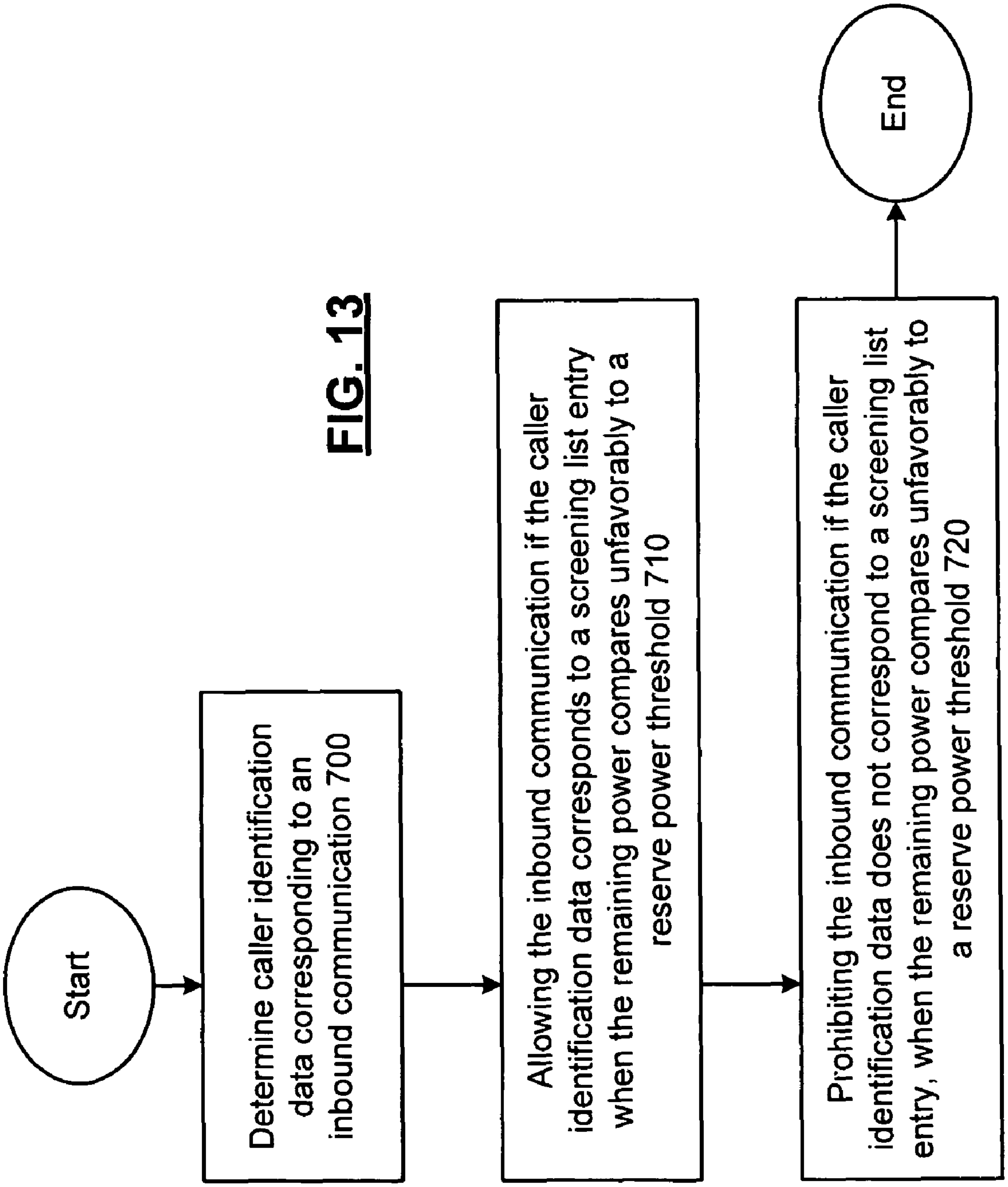
FIG. 13 presents a flowchart representation of a method in accordance with an embodiment of the present invention.

FIG. 13 presents a flowchart representation of a method in accordance with an embodiment of the present invention. In particular, this method can be used in conjunction with the embodiments of the present invention described in conjunction with FIGS. 1-11. The method begins in step 700 by determining caller identification data corresponding to an inbound communication. In step 710, the inbound communication is allowed if the caller identification data corresponds to a screening list entry when the remaining power compares unfavorably to a reserve power threshold. In step 720, the inbound communication is prohibited if the caller identification data does not correspond to a screening list entry, when the remaining power compares unfavorably to a reserve power threshold.

Figure 14:
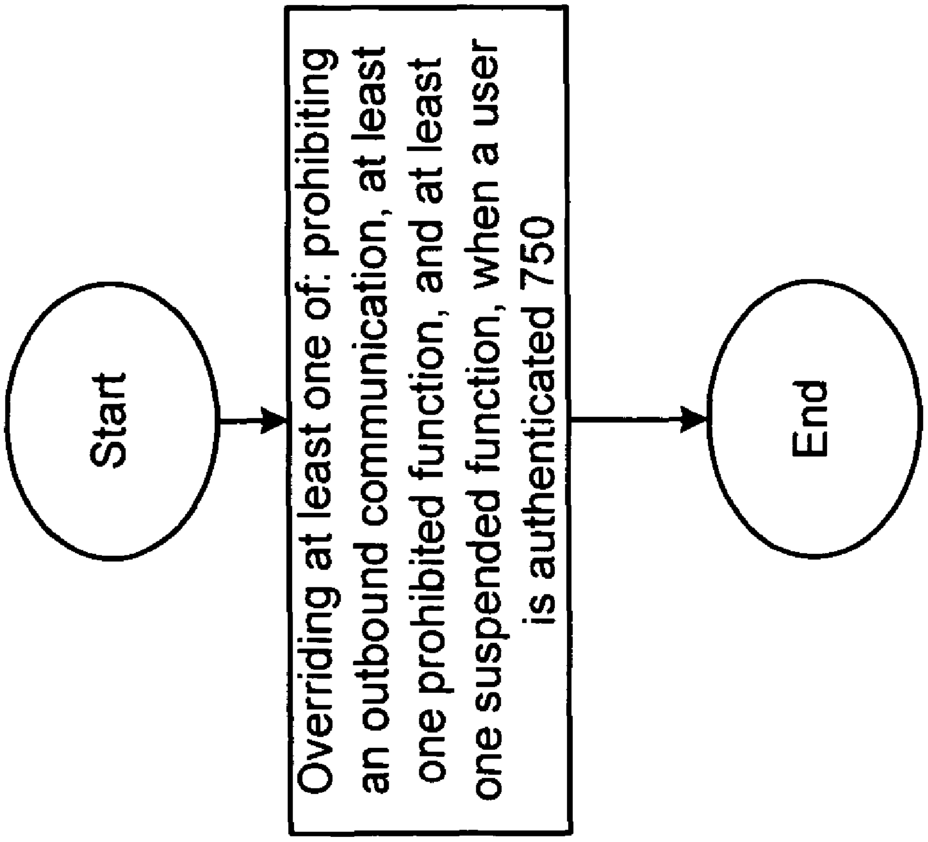
FIG. 14 presents a flowchart representation of a method in accordance with an embodiment of the present invention.

FIG. 14 presents a flowchart representation of a method in accordance with an embodiment of the present invention. In particular, this method can be used in conjunction with the embodiments of the present invention described in conjunction with FIGS. 1-13. The method includes the addition step 750 of overriding at least one of: prohibiting an outbound communication, at least one prohibited function, and at least one suspended function, when a user is authenticated.

While the description above has set forth several different modes of operation, the wireless handset 150 may simultaneously be in two or more of these modes, unless, by their nature, these modes necessarily cannot be implemented simultaneously.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology and can include one or more system on a chip integrated circuits that implement any combination of the devices, modules, submodules and other functional components presented herein. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a wireless handset. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A wireless handset comprising:

a long range wireless transceiver for selectively providing an inbound communication and an outbound communication through a wireless telephone network;

an audio playback module, operably coupled to the processing module, for selectively producing an audio output from a stored audio file; wherein the long range wireless transceiver and audio playback module are powered from a single battery;

a battery monitor module for monitoring a remaining power of a battery and for asserting a control signal when the remaining power compares unfavorably to a reserve power threshold; and a processing module, operably coupled to the long range wireless transceiver and the battery monitor module, for allowing an outbound communication from the range wireless transceiver while powered from single battery to an allowed recipient when the control signal is asserted, for prohibiting the production of an audio output from a stored audio file when the control signal is asserted, and for prohibiting an outbound communication to a disallowed recipient when the control signal is asserted, wherein the prohibiting an outbound communication to a disallowed recipient is overridden one time with entry of a one time password.

2. The wireless handset of claim 1 further comprising:

a memory module, operably coupled to the processing module, for storing a communication screening list that includes the allowed recipient.

3. The wireless handset of claim 2 wherein the communication screening list can be locked and is only accessible for modification by a secure access process.

4. The wireless handset of claim 2 wherein the communication screening list includes at least one user defined recipient.

5. The wireless handset of claim 2 wherein the communication screening list includes at least one service defined recipient.

6. The wireless handset of claim 1 wherein the wireless handset further comprises:

at least one functional module, operably coupled to the processing module, for providing at least one function, wherein the at least one function includes one of: a user interactive game, and access to a peripheral device;

wherein the processing module is further operable to prohibit the at least one function when the control signal is asserted.

7. The wireless handset of claim 6 wherein the processing module is further operable to suspend the at least one function when the at least one function is in progress when the control signal is asserted.

8. The wireless handset of claim 7 wherein the processing module is further operable to produce a suspending function indicator, prior to suspending the at least one function.

9. The wireless handset of claim 1 wherein the processing module is further operable to end a call in progress when the control signal is asserted.

10. The wireless handset of claim 9 wherein the processing module is further operable to produce an audible suspending call indicator, prior to ending the call.

11. The wireless handset of claim 1 wherein the processing module is further operable to end the production of an audio output in progress when the control signal is present.

12. The wireless handset of claim 11 wherein the processing module is further operable to produce an audible suspending playback indicator, prior to ending the production of audio output.

13. The wireless handset of claim 2 further comprising a display device and wherein the communication screening list includes a plurality of allowed recipients and is presented on the display device in a navigational form for selection of the allowed recipient.

14. The wireless handset of claim 1 wherein the reserve power threshold is above the minimum amount required to power the device with the single battery while placing the outbound call communication.

15. The wireless handset of claim 1 wherein the processing module is further operable to prohibit the inbound communication when the control signal is asserted.

16. The wireless handset of claim 1 wherein the processing module is further operable to determine caller identification data corresponding to the inbound communication, for allowing an inbound call if the caller identification data corresponds to a screening list entry when the control signal is asserted, and for prohibiting the inbound call if the caller identification data does not correspond to a screening list entry, when the control signal is asserted.

17. The wireless handset of claim 1 further comprising:

an authentication module, operably coupled to the processing module, for overriding at least one of: prohibiting an outbound communication, prohibiting the production of an audio output; at least one prohibited function, and at least one suspended function, when user is authenticated by a secure access process.

18. A wireless handset comprising:

a long range wireless transceiver for selectively providing an inbound communication and an outbound communication through a wireless telephone network;

a battery monitor module for monitoring a remaining power of a battery and for asserting a control signal when the remaining power compares unfavorably to a reserve power threshold;

a processing module, operably coupled to the long range wireless transceiver and the battery monitor module, for allowing an outbound communication to an allowed recipient when the control signal is asserted, and for prohibiting an outbound communication to a disallowed recipient when the control signal is asserted, wherein the prohibiting an outbound communication to disallowed recipient is overridden one time with entry of a one time password; and an authentication module, operably coupled to the processing module, for authenticating a user and once authenticated by a secure access process, allowing the user to modify at least one of a listing of allowed and a listing of disallowed recipients.

19. The wireless handset of claim 18 further comprising:

a memory module, operably coupled to the processing module, for storing a communication screening list that includes the allowed recipient.

20. The wireless handset of claim 19 wherein the communication screening list can be locked and is accessible for modification only by a user that has been authenticated by a secure access process.

21. The wireless handset of claim 19 wherein the communication screening list includes at least one user defined recipient.

22. The wireless handset of claim 19 wherein the communication screening list includes at least one service defined recipient.

23. The wireless handset of claim 18 wherein the wireless handset further comprises:

at least one functional module, operably coupled to the processing module, for providing at least one function, wherein the at least one function includes one of: a user interactive game, playback of a stored audio file, capturing an image, Internet access, access to a broadband data network, and access to a peripheral device;

wherein the processing module is further operable to prohibit the at least one function when the control signal is asserted.

24. The wireless handset of claim 23 wherein the processing module is further operable to suspend the at least one function when the at least one function is in progress when the control signal is asserted.

25. wireless handset of claim 24 wherein the processing module is further operable to produce a suspending function indicator, prior to suspending the at least one function.

26. The wireless handset of claim 18 wherein the processing module is further operable to end a call in progress when the control signal is present.

27. The wireless handset of claim 26 wherein the processing module is further operable to produce an audible suspending call indicator, prior to ending the call.

28. The wireless handset of claim 19 further comprising a display and wherein the communication screening list includes a plurality of allowed recipients and is presented on the display device in a navigational from for selection of the allowed recipient.

29. The wireless handset of claim 18 wherein the reserve power threshold is above the minimum amount required to power the device while placing the outbound call communication.

30. The wireless handset of claim 18 wherein the processing module is further operable to prohibit the inbound communication when the control signal is asserted.

31. The wireless handset of claim 18 wherein the processing module is further operable to determine caller identification data corresponding to the inbound communication, for allowing an inbound call if the caller identification data corresponds to a screening list entry when the control signal is asserted, and for prohibiting the inbound call if the caller identification data does not correspond to a screening list entry, when the control signal is asserted.

32. The wireless handset of claim 18 further comprising:

the authentication module, operably coupled to the processing module, for overriding at least one of: prohibiting an outbound communication, at least one prohibited function, and at least one suspended function, when user is authenticated.

33. A method comprising:

monitoring a remaining power of a wireless handset battery;

producing a control signal when the remaining power compares unfavorably to a reserve power threshold;

allowing an outbound communication from the wireless handset, powered from the wireless handset battery, to an allowed recipient when the remaining power compares unfavorably to a reserve power threshold; and prohibiting an outbound communication to a disallowed recipient when the remaining power compares unfavorably to a reserve power threshold, wherein the prohibiting an outbound communication to a disallowed recipient when the remaining power compares unfavorably to a reserve power threshold is overridden one time with entry of a one time password.

34. The method of claim 33 further comprising:

storing a communication screening list that includes the allowed recipient.

35. The method of claim 34 further comprising:

locking the communication screening list and then allowing a change to the communication screening list only when a user has been authenticated.

36. The method of claim 34 wherein the communication screening list includes at least one user defined recipient.

37. The method of claim 34 wherein the communication screening list includes at least one service defined recipient.

38. The method of claim 33 further comprising:

prohibiting at least one function of the wireless handset when the control signal is asserted, wherein the at least one function includes one of: a user interactive game, playback of a stored audio file, Internet access, access to a broadband data network, and access to a peripheral device.

39. The method of claim 38 further comprising:

suspending the at least one function when the at least one function is in progress when the remaining power compares unfavorably to a reserve power threshold.

40. The method of claim 39 further comprising:

producing a suspending function indicator, prior to suspending the at least one function.

41. The method of claim 33 further comprising:

ending a call of the wireless handset in progress when the remaining power unfavorably to a reserve power threshold.

42. The method of claim 33 further comprising:

producing an audible suspending call indicator, prior to ending the call.

43. The method of claim 33 wherein the reserve power threshold is above the minimum amount required to power the device from the wireless handset battery while placing the outbound communication.

44. The method of claim 33 further comprising:

prohibiting inbound communications when the remaining power compares unfavorably to a reserve power threshold.

45. The method of claim 33 further comprising:

determining caller identification data corresponding to an inbound communication, allowing the inbound communication if the caller identification data corresponds to a screening list entry when the remaining power compares unfavorably to a reserve power threshold, and prohibiting the inbound communication if the caller identification data does not correspond to a screening list entry, when the remaining power compares unfavorably to a reserve power threshold.

46. The method of claim 33 further comprising:

overriding at least one of: prohibiting an outbound communication, at least one prohibited function, and at least one suspended function, when a user is authenticated.

47. A wireless handset comprising:

a long range wireless transceiver for a single battery source for selectively providing an inbound communication and an outbound communication through a wireless telephone network;

a battery monitor module for monitoring a remaining power of a battery source and for asserting a control signal when the remaining power compares unfavorably to a reserve power threshold; and a processing module, operably coupled to the long range wireless transceiver and the battery monitor module, for allowing an outbound communication powered by the single battery source to an allowed recipient when the control signal is asserted, and for prohibiting at least one function of the wireless handset when the control signal is asserted, wherein the prohibiting at least one function of the wireless handset is overridden one time with entry of a user password; and an authentication module for providing a user with secure access to a listing of potential recipients for the purposes of changing the listing of potential recipients.

* * * * *

UNITED STATES PATENT AND TRADEMARK OFFICE

CERTIFICATE OF CORRECTION

PATENT NO. : 7,844,307 B2
APPLICATION NO. : 11/340441
DATED : November 30, 2010
INVENTOR(S) : Henson et al.

It is certified that error appears in the above-identified patent and that said Letters Patent is hereby corrected as shown below:

Column 13 line 30 please delete “a” and insert --the single-- after the words power of
Column 13 line 35 please insert --long-- after the word the
Column 12 line 36 please insert --the-- after the word from
Column 15 line 45 please delete “from” and insert --form--
Column 15 line 66 please insert --the-- after the word when
Column 17 line 6 please delete “for” and insert --powered from-- after the word transceiver Signed and Sealed this
Twenty-second Day of February, 2011

David J. Kappos
*Director of the United States Patent and Trademark Office*